United States Patent
Islam et al.

(10) Patent No.: US 8,412,088 B2
(45) Date of Patent: Apr. 2, 2013

(54) IMAGE ALIGNMENT PROCEDURE

(75) Inventors: Abu Saeed Islam, Rochester, NY (US); Rakesh Suresh Kulkarni, Webster, NY (US); Jack Elliot, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 609 days.

(21) Appl. No.: 12/486,955

(22) Filed: Jun. 18, 2009

(65) Prior Publication Data
US 2010/0322688 A1    Dec. 23, 2010

(51) Int. Cl.
*G03G 15/00* (2006.01)
*H04N 1/04* (2006.01)

(52) U.S. Cl. .................................. 399/379; 358/474

(58) Field of Classification Search ............. 399/213, 399/379, 7, 365, 371, 372; 382/287, 289; 358/488, 474, 453
See application file for complete search history.

(56) References Cited

U.S. PATENT DOCUMENTS

| | | | |
|---|---|---|---|
| 1,679,927 A * | 8/1928 | Bell et al. | 33/430 |
| 6,208,438 B1 * | 3/2001 | Watanabe et al. | 358/488 |
| 2003/0053045 A1 * | 3/2003 | Doering | 356/237.1 |
| 2005/0286922 A1 * | 12/2005 | Oki | 399/75 |
| 2006/0285162 A1 * | 12/2006 | Honma | 358/1.18 |

FOREIGN PATENT DOCUMENTS

JP    2007304170    * 11/2007

* cited by examiner

*Primary Examiner* — Judy Nguyen
*Assistant Examiner* — Ruben Parco, Jr.
(74) *Attorney, Agent, or Firm* — Ronald E. Prass, Jr.; Prass LLP

(57) ABSTRACT

This is an alignment system where precise alignment of a reproducible image is obtained with respect to the paper. An imaged paper to be reproduced is placed on a light table having a right angle fitting or marking. The paper is placed on top of the light table and is aligned with this right angle marking. A transparent platen with marked scales is placed over the imaged paper and also aligned with the right angle fitting. The scales are placed over the corners of the image and image corner location readings are taken from the scales. These readings are then entered and fixed into a marking system such as an electrophotographic printer for reproduction of copies from the aligned and fixed original image.

10 Claims, 6 Drawing Sheets

IMAGE ALIGNMENT PROCEDURE

This invention relates to image alignment assemblies and processes of any marking systems.

BACKGROUND

The alignment assembly and process of this invention is appropriate for use in aligning any reproducible image in any marking system. However, for the sake of clarity, the present invention will be described herein as it relates to electrophotographic marking systems.

In electrostatographic process, a system is used whereby a uniform electrostatic charge is placed upon a reusable photoconductive surface. The charged photoconductive surface is then exposed to a light image of a scanned original document to selectively dissipate the charge to form a latent electrostatic image of this original on the photoreceptor. The latent image is developed by depositing finely divided marking and charged particles (toner) upon the photoreceptor surface. The charged toner is electrostatically attached to the latent electrostatic image areas to create a visible replica of the original. The toned developed image is then transferred from the photoconductor surface to a final image support material, such as paper, and the toner image is fixed thereto by heat and pressure to form a permanent copy corresponding to the original.

In xerographic systems of this type, a photoreceptor surface is generally arranged to move in an endless path through the various processing stations of the xerographic process. The photoconductive or photoreceptor surface is generally reusable whereby the toner image is transferred to the final support material and the surface of the photoreceptor is prepared to be used once again for another reproduction of an original scanned document.

Several methods are known for applying an electrostatic charge to the photosensitive member such as the use of electron-emitting pins, an electron-emitting grid, single corona-charging structures and single for multiple dicorotron wire assemblies. In recent development of high speed xerographic reproduction machines where copiers can produce at a rate of or in excess of three thousand copies per hour, the need for reliable and properly aligned reproducible and final copies is required.

Image on paper errors can show up as absolute position errors, magnification or shrinkage errors and image skew errors. Position errors are caused by the paper alignment devices. Magnification and shrinkage errors are caused due to shrinkage of paper in the fuser and errors in photoreceptors or ROS polygon speeds. Skew errors are caused by ROS skew and errors in image alignment devices. In the alternative current procedures for image on paper registration on electrostatic printing machines is extremely tedious, iterative and cumbersome. It involves printing internal test prints and manual measurement of different artifacts on every side of the paper with a flexible scale and inputting those values to the printer. This is done in a serial fashion, one factor at a time, resulting in a long setup time and setup errors and customer dissatisfaction.

SUMMARY

The various embodiments of the present invention provide a system, process and apparatus whereby precise and proper alignment of an image on an original to be reproduced document is effectively achieved.

This invention proposes an alternate way of measuring location of marks on paper for registration setup. The procedure (and alignment assembly) consists of aligning the paper to be measured on a light table with right angle edges. A glass (or other suitable material) platen with etched scales in the areas where the marks are to be measured will be then placed on the paper aligning it to the same right angle edges. The locations of the marks will then be read off the scales on the glass platen using an eye loupe, if the image needs magnification.

There is currently provided in most xerographic marking machines a menu that accepts input on several aspects of the machine. One of these is "image registration" input where the user enters prior image measurements of the different artifacts or features in order to set and fix these measurements in the marking machine. Generally, in the prior art, a reference table is provided where the various measurements are entered in the table. For example, a measurement "a" which may be a diagonal measurement is taken from an upper left corner of the image to a lower right corner of the image. Other separate measurements b, c, d, e, f and g are also taken and indicated in the table before the completed table is entered into the machine. This prior art procedure is very time consuming (about 35 minutes for each image) and tedious.

In the present invention, a procedure and assembly is provided for image alignment that can be completed in 5-10 minutes, is much less tedious and accomplishes, for the user a very accurate image alignment. A recording table is used in the prior art and in the present invention. However, the measurements obtained for entrance in the table are significantly reduced in the present invention, as above noted.

DETAILED DISCUSSION OF DRAWINGS AND PREFERRED EMBODIMENTS

Figure 1:
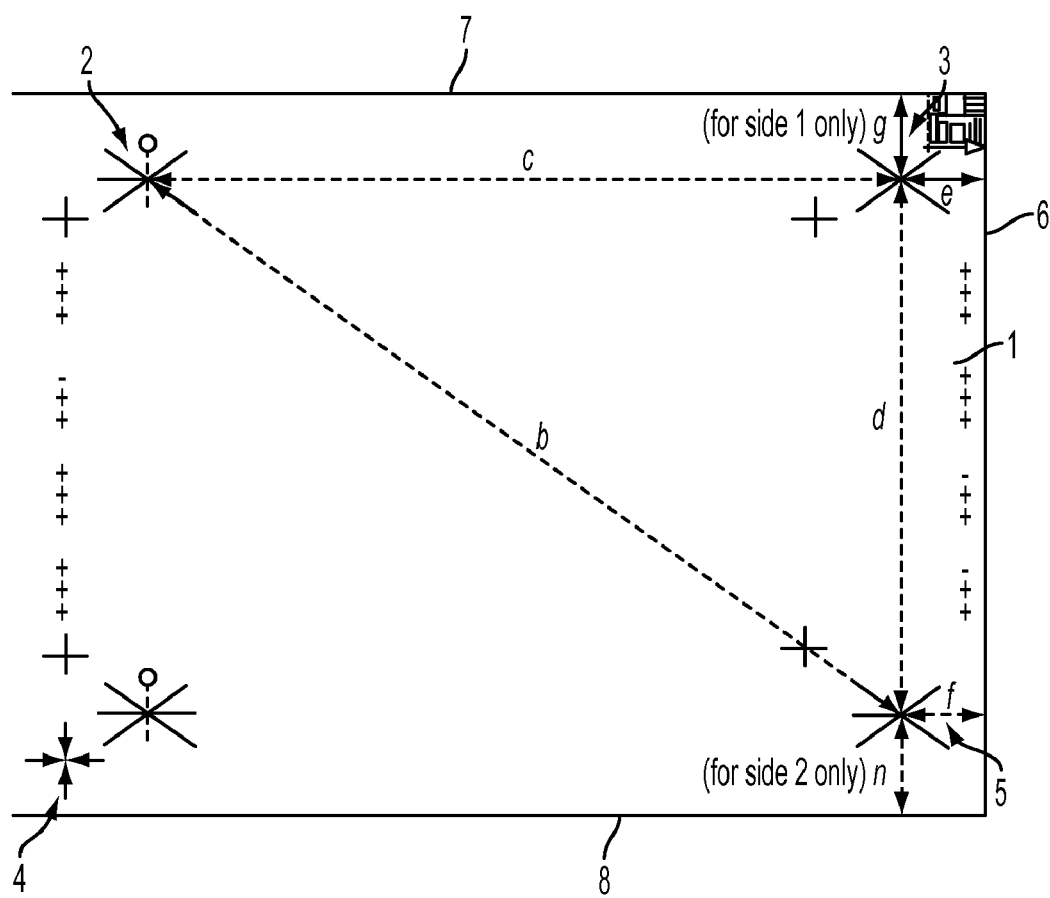
FIG. 1 illustrates a prior art alignment procedure which indicates the various measurements that are required.

In FIG. 1, a prior art imaged (image not shown for clarity) sheet 1 is illustrated having various measurements indicated thereon. The corners 2, 3, 4, and 5 of the images are measured "b" measurement being the diagonal measurement from the upper left corner 2 of the image to the lower right corner 5 of the image. "c" is the measurement taken by the user from the upper left corner 2 of the image to the upper right corner 3 of the image. "d" is the measurement from the upper right corner 3 of the image to the lower right corner 5 of the image. "e" is the measurement of the distance from the upper right corner 3 of the image to the right edge 6 of the paper 1. "f" is the measurement of the lower right corner 5 of the image to the right edge 6 of the paper 1. "g" is the measurement of the distance between the upper right corner 3 of the image to the top edge 7 of the paper 1. "f" is the measurement of the distance between the lower right corner 5 of the image to the bottom edge 8 of paper 1. Each measurement b, c, d, e, and f is tediously measured by a ruler, yardstick or any other manual device until all are recorded, then entered into a table (see FIG. 6) for entrance into the marking machine. This prior art process consumes about 35 minutes for each imaged side of paper 1.

Figure 2:
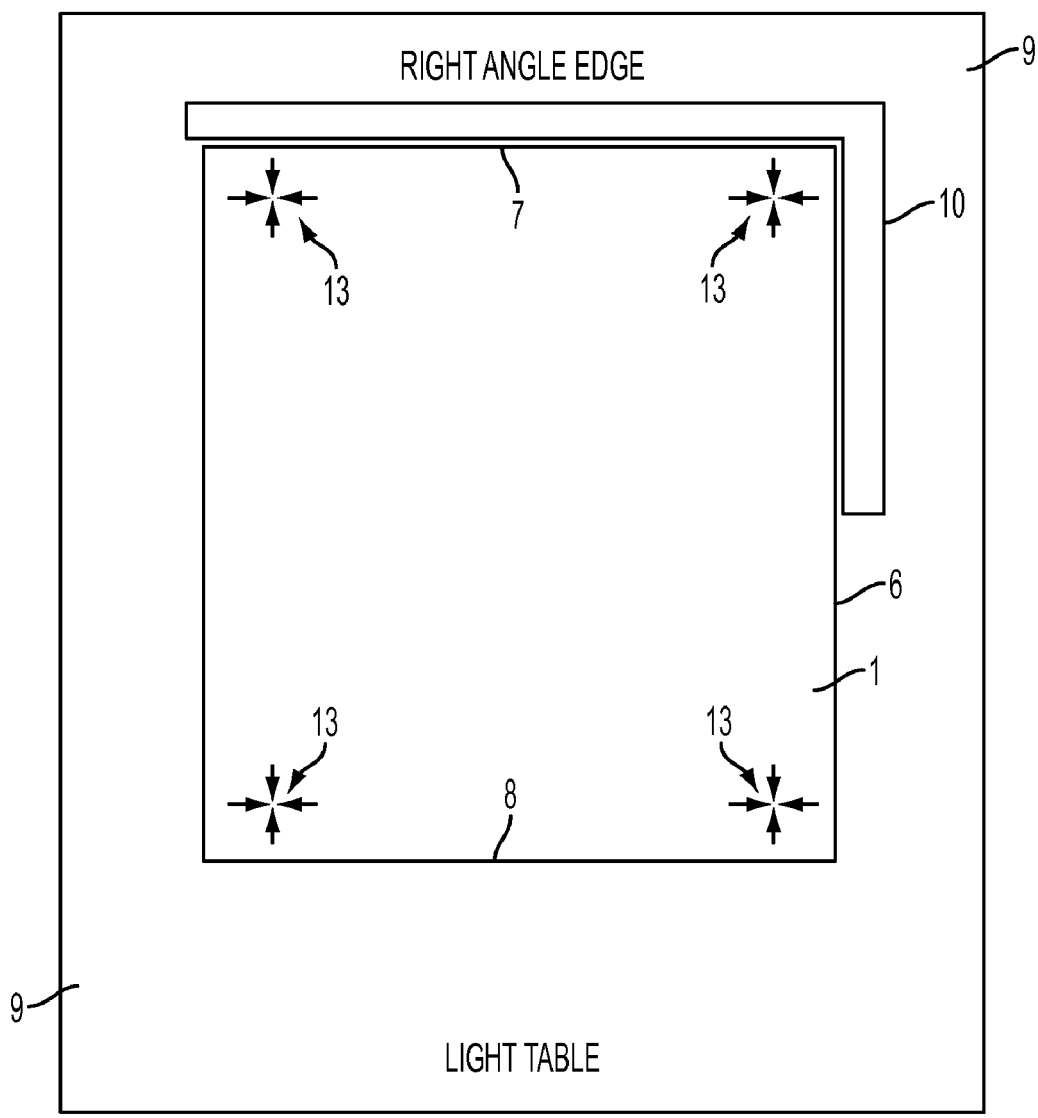
FIG. 2 illustrates the light table with raised right angle edges for use in paper alignment and the paper aligned thereon.
Figure 3:
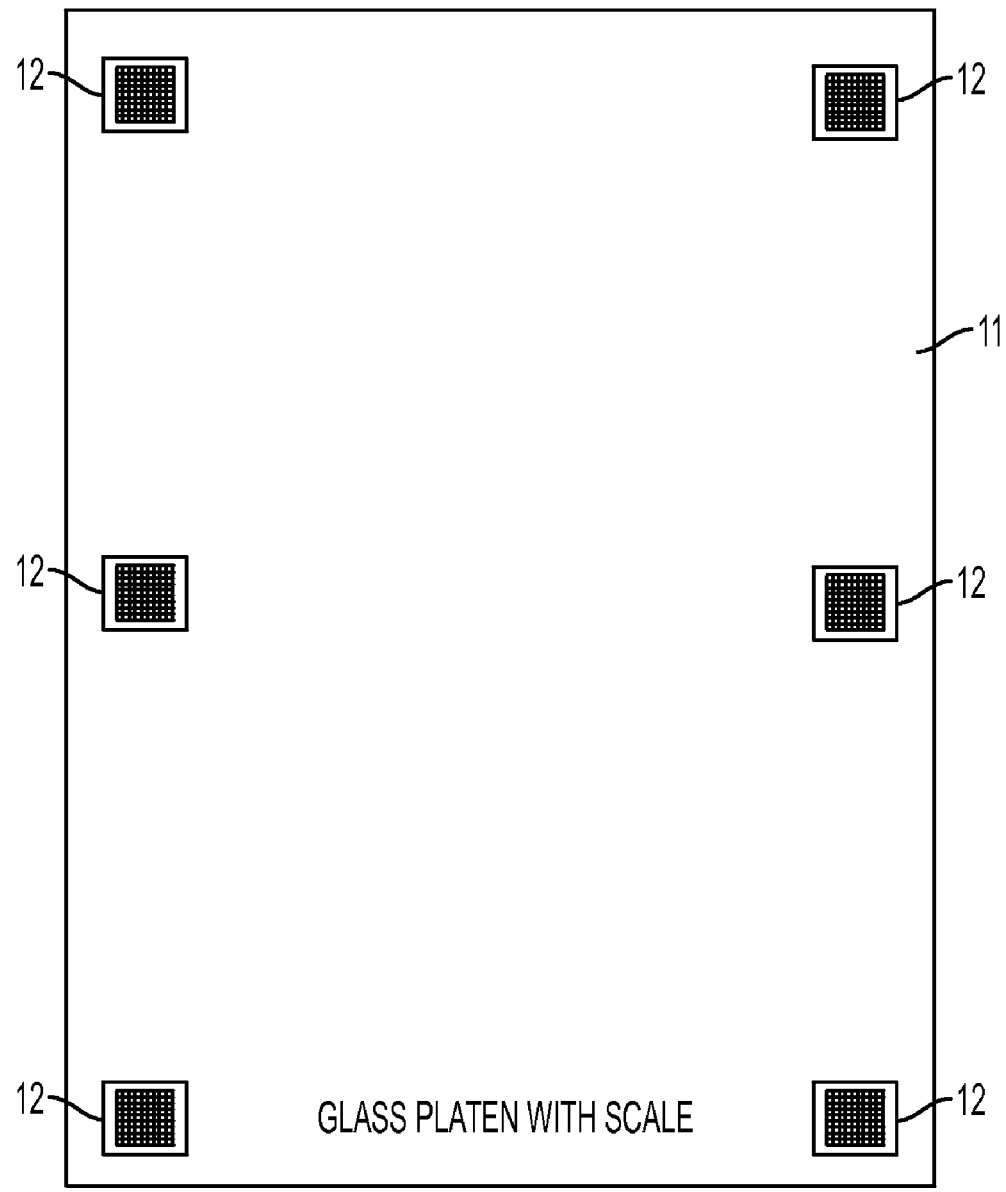
FIG. 3 shows the platen with the scales to be placed over the imaged paper.
Figure 4:
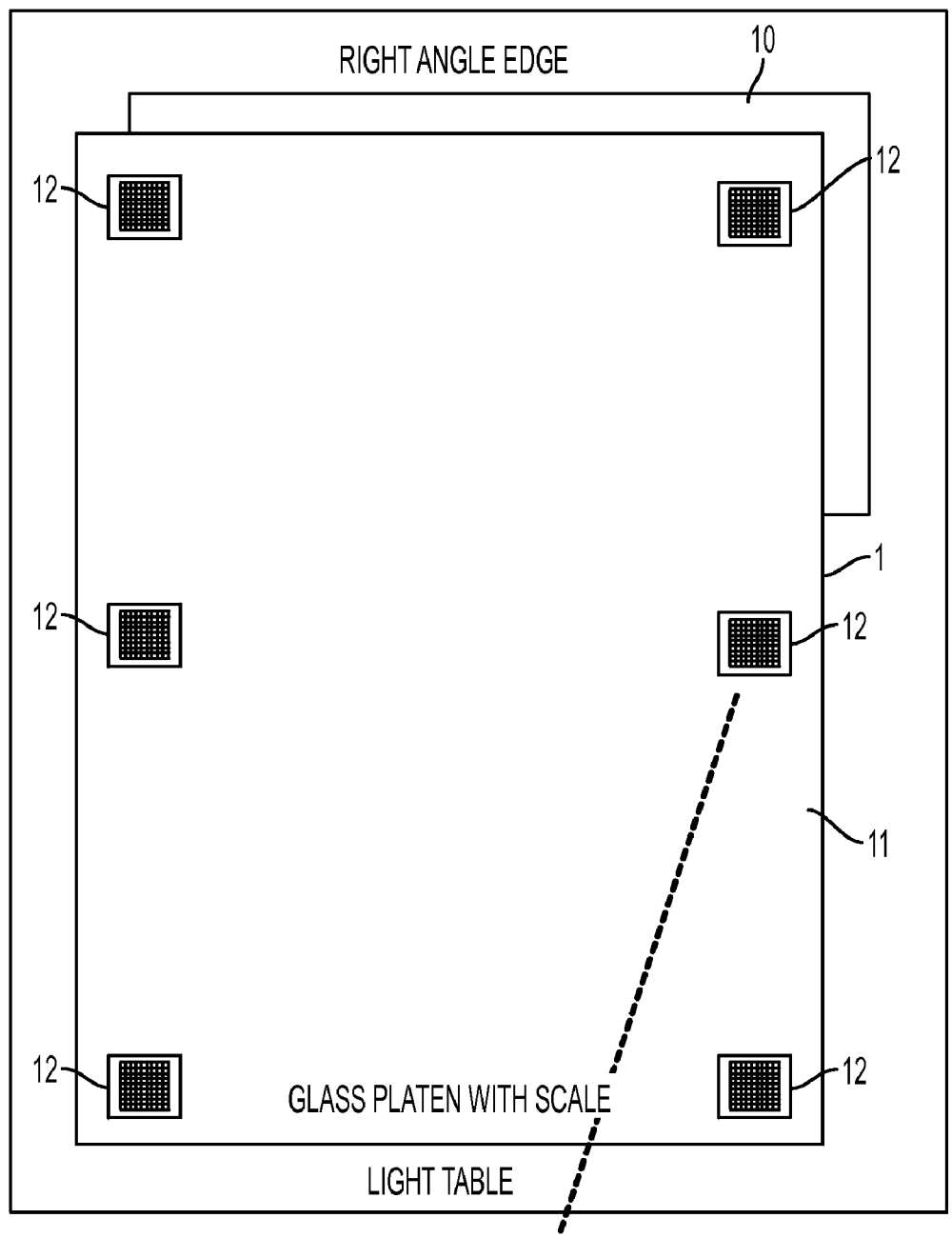
FIG. 4 illustrates the glass platen with etched scales as it is placed over the paper and used in measuring the image distances.

FIG. 2, a light table 9 used in an embodiment of the present invention is illustrated having a right angle edge 10 (which may preferably be raised) for receiving an imaged paper 1 and alignment of the upper or top right paper edge 7 within the right angle edge 10 on light table 9. Once the paper 1 is aligned within the right angle edge 10, the glass (or other material) platen 11 with etched scales 12 of FIG. 3 is placed over the imaged paper 1 as shown in FIG. 4 with each scale 12 placed over the corners 13 of the image. The locations of the marks 13 will then be read off the scales 12 on the glass platen 11 using an eye loupe. The "light table" used in the present invention is defined as a table with a light transmitting top portion that is configured to make visible an image on the paper side opposite the imaged side. The right angle fitting can be etched on the table top, marked on the table top, or a raised right angle portion like an inverted L shape. The light from the light table must be strong enough to provide visibility of the image through to the scales used to measure the locations of the image. An eye loupe can be used to read the scales on the platen if the scales are too small to read without magnification.

Figure 5:
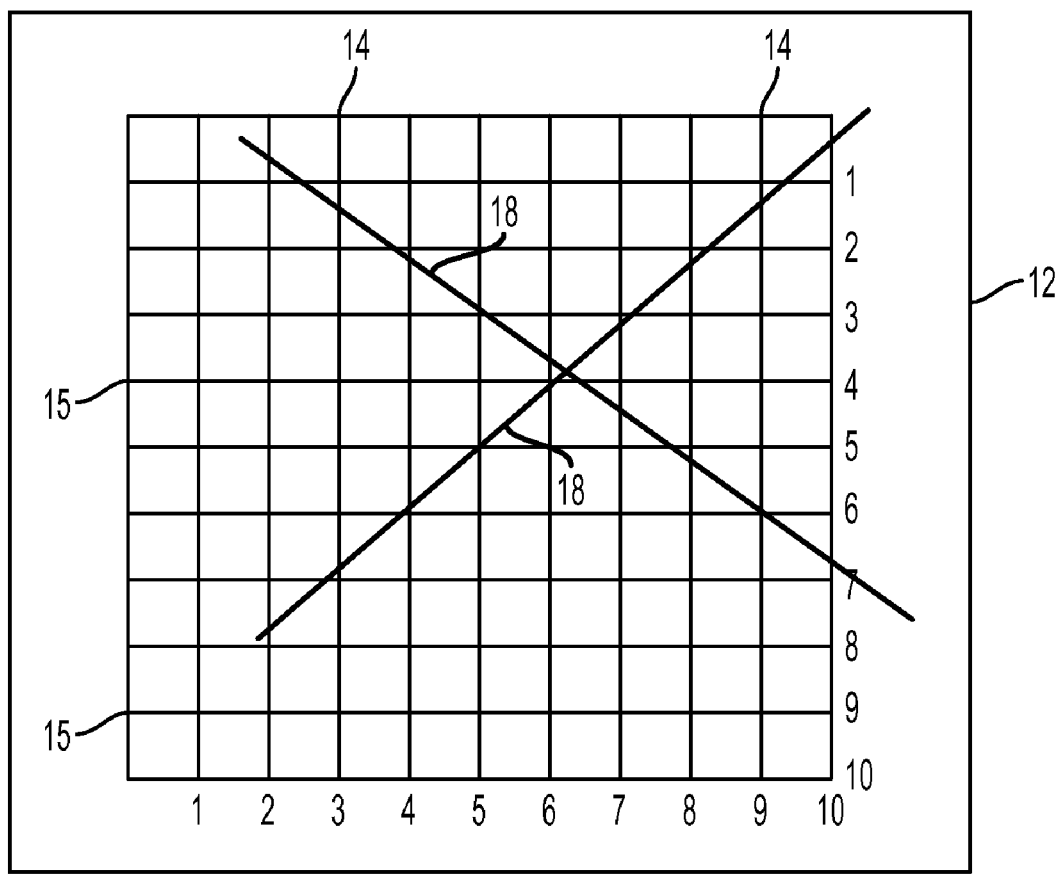
FIG. 5 illustrates the etched scale(s) used in an embodiment of the present invention with reference numbers.

FIG. 5 illustrates the scale(s) 12 in a blown up view having marked vertical 14 and horizontal 15 measurement lines. These lines in one embodiment are marked from 1-10. The image corner marks 13 can be viewed through the transparent platen 11 and easily read. After the location of the cross hairs or marks 13 are measured with the etched scale 12 (in FIG. 5, lines 18 meet at 4 and 6), the parameters b, c, d, e, f, g and h could be easily determined and typed as actual measurement 17 in the table 16 (of FIG. 6) for registration setup and entrance into the xerographic copier or printer.

This is an alignment system where precise alignment of a reproducible image with respect to paper is obtained. An imaged paper to be reproduced is placed on a light table having a right angle fitting or marking. The paper is placed on top of the light table and is aligned with this right angle marking. A transparent platen with marked scales is placed over the imaged paper and also aligned with the right angle fitting. The scales are placed over the corners of the image and image corner location readings are taken from the scales. These readings are then entered and fixed into a marking system such that the printer can make the necessary corrections for accurate alignment of the image with respect to the paper.

The location of the cross hairs on side 2 could be measured by flipping the test target or the light table could enable the measurements of both sides simultaneously. In another embodiment, it could be conceived that the glass platen with the scale hinged in on the light table with the edges for ease of use. Alternately, to reduce cost, a strong polyester film with photo-plotted scales can be used in place of the glass platen.

Figure 6:
FIG. 6 illustrates a typical table used to enter the measurements in the marking machine.

The readings on the table of FIG. 6 are entered from the table into the menu portion of the marking machine for a permanent fix for reproduction of the aligned image, for example, in reproducing a page of a book for 100 or so reproductions.

The embodiments of the present invention provide a paper reproducible image alignment assembly comprising a light table with a right angle fitting on a table top portion and a transparent platen with at least three marked scales positioned in corners of the platen. This right angle fitting is positioned in at least one corner section of the light table and is configured to receive and align an aligned paper sheet placed on top of the table at its right angle location.

The light table has a light transparency portion at the table top portion. The transparent platen is configured to be positioned above the aligned paper sheet where the marked scales are readably positioned above at least three corners of an image on the aligned paper sheet. In one embodiment, the right angle fitting is raised above a surface of the table top portion.

The marked scales have graph-like horizontal and vertical intersecting lines that are configured to indicate and mark a location of an image below the scales. In one embodiment, the platen is made from transparent glass having etched scales thereon. Generally, there are from 3 to 6 scales. Each of the scales have numerical designations for each horizontal and vertical intersecting lines positioned thereon so that numerical designations read can be subsequently recorded and entered into an image-marking apparatus.

In another embodiment, the platen is made from a member selected from the groups consisting of transparent glass, transparent films, transparent plastics, transparent compositions and mixtures thereof. The marked scales are selected from the group consisting of etched scales, photo-plotted scales, permanent ink scales and mixtures thereof. The scale is configured to receive cross hairs designating a location of an image corner. These cross hairs are located at marked and readable positions on horizontal and vertical lines located on the scale.

The process of using this above assembly comprises providing a light table with a right angle fitting on a transparent table top portion, providing a transparent platen with at least three marked scales positioned in corners of the platen, aligning an originally to be reproduced imaged paper with the right angle, fitting on the table top portion, placing the transparent platen on the paper with the scales placed above areas where images or marks on the paper are to be measured, aligning the platen to a same right angle used to align the imaged paper on the right angle fitting, reading(s) of locations of the marks as indicated by cross hairs on the scales and entering these readings into a marking apparatus for fixing these readings for reproductions of original images or markings.

In this process, the readings are recorded and placed on a table prior to entering the readings into the marking apparatus. Generally, there are from 3-6 marked scales, each having graph-like horizontal and vertical intersecting lines. These lines are configured to indicate a location of the images or markings on the paper sheet.

The platen is constructed of a transparent material having etched or photo-plotted scales. In one embodiment, the marking apparatus is an electrophotographic marking machine. The right angle fitting is preferably raised above the table top portion.

The different measurements taken between the images are designated as parameters a, b, c, d, e, f, g and h and these measurements are recorded on a table and subsequently entered into and fixed in the marking apparatus for reproduction of aligned images on the reproduced papers. This invention provides that images on both sides of the paper sheet are aligned and recorded in the marking apparatus.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A paper reproducible image alignment assembly comprising:
   a light table with a right angle fitting on a table top portion forming a right angle location positioned in at least one corner section of said light table, and a light transparency portion positioned at said table top portion, the right angle fitting being configured to receive and align a paper sheet placed at the right angle location; and
   a transparent platen configured to be positioned above said right angle location and said paper sheet, the transparent platen comprising 5 to 6 independent marked scales each having horizontal and vertical intersecting lines that form respective grid systems, the 5-6 independent marked scales being positioned on said transparent platen such that the transparent platen has completely blank spacing between all of the independent marked scales,
   wherein said independent marked scales are configured to facilitate determining location measurements of at least three positions of an image on said paper sheet relative to at least three of the 5-6 independent marked scales, the location measurements corresponding to marking system input parameters upon which an alignment of a reproduction of the image is based.

2. The assembly of claim 1 wherein said right angle fitting is raised above a surface of said table top portion.

3. The assembly of claim 1 wherein said platen is made from transparent glass having etched said scales thereon.

4. The assembly of claim 1 wherein each of said independent marked scales has numerical designations for each of the horizontal and vertical intersecting lines positioned thereon, the location measurements being determined based on the numerical designations and recorded in a table having said input parameters to facilitate the alignment of the reproduction of the image.

5. The assembly of claim 1 wherein said transparent platen is made from a member selected from the groups consisting of transparent glass, transparent films, transparent plastics, transparent compositions and mixtures thereof.

6. The assembly of claim 1 wherein said independent marked scales are selected from the group consisting of etched scales, photo-plotted scales, permanent ink scales and mixtures thereof.

7. A process for aligning a reproducible image on a paper sheet, said process comprising:
   providing a light table with a right angle fitting on a transparent table top portion;
   providing a transparent platen configured to be positioned above said right angle location and said paper sheet, the transparent platen comprising 5 to 6 independent marked scales each having horizontal and vertical intersecting lines that form respective grid systems, the 5-6 independent marked scales being positioned such that the transparent platen has completely blank spacing between all of the independent marked scales;
   aligning a paper sheet having an image with said right angle, thereby fitting said paper sheet on said table top portion;
   placing said transparent platen over said paper sheet;
   aligning said transparent platen with the right angle fitting; and
   determining location measurements of at least three positions of the image relative to at least three of the 5-6 independent marked scales, the location measurements corresponding to marking system input parameters upon which an alignment of a reproduction of the image is based.

8. The process of claim 7 wherein said platen is constructed of a transparent material having etched or photo-plotted said scales.

9. The process of claim 7 wherein said right angle fitting is raised above said table top portion.

10. The process of claim 7 wherein said location measurements are recorded in a table having said input parameters to facilitate the alignment of the reproduction of the image.

* * * * *